(12) United States Patent
Suzuki

(10) Patent No.: US 7,105,259 B2
(45) Date of Patent: Sep. 12, 2006

(54) COATING LIQUID FOR ELECTROPHOTOGRAPHIC PHOTORECEPTOR, ELECTROPHOTOGRAPHIC PHOTORECEPTOR, AND IMAGE FORMING METHOD AND APPARATUS USING THE PHOTORECEPTOR

(75) Inventor: Yasuo Suzuki, Shizuoka-ken (JP)

(73) Assignee: Ricoh Company Limited, Tokyo (JP)

( * ) Notice: Subject to any disclaimer, the term of this patent is extended or adjusted under 35 U.S.C. 154(b) by 8 days.

(21) Appl. No.: 11/013,542

(22) Filed: Dec. 17, 2004

(65) Prior Publication Data

US 2005/0100803 A1    May 12, 2005

Related U.S. Application Data

(62) Division of application No. 10/244,444, filed on Sep. 17, 2002, now Pat. No. 6,864,027.

(30) Foreign Application Priority Data

Sep. 17, 2001   (JP) .............................. 2001-282368

(51) Int. Cl.
G03G 13/16   (2006.01)
(52) U.S. Cl. ................ 430/100; 430/126; 430/131
(58) Field of Classification Search ................ 430/100, 430/126, 131
See application file for complete search history.

(56) References Cited

U.S. PATENT DOCUMENTS

| 4,579,801 A | 4/1986 | Yashiki |
|---|---|---|
| 5,965,311 A | 10/1999 | Suzuki |
| 6,143,453 A * | 11/2000 | Sugimura et al. .............. 430/65 |
| 6,214,506 B1 * | 4/2001 | Kurihara et al. ............... 430/65 |
| 6,355,390 B1 | 3/2002 | Yamanami et al. |
| 6,383,699 B1 * | 5/2002 | Yuh et al. ..................... 430/65 |
| 6,819,892 B1 | 11/2004 | Nakazato et al. |
| 6,830,858 B1 | 12/2004 | Sugino et al. |
| 2004/0057059 A1 | 3/2004 | Miura et al. |

FOREIGN PATENT DOCUMENTS

| JP | 5-204181 | 8/1993 |
|---|---|---|
| JP | 8-44096 | 1/1996 |
| JP | 9-34152 | 2/1997 |
| JP | 9-292730 | 11/1997 |
| JP | 10-83093 | 3/1998 |
| JP | 10-90931 | 4/1998 |
| JP | 10-301314 | 11/1998 |
| JP | 11-15181 | 1/1999 |

OTHER PUBLICATIONS

U.S. Appl. No. 11/013,542, filed Dec. 17, 2004, Suzuki.

* cited by examiner

*Primary Examiner*—John L Goodrow
(74) *Attorney, Agent, or Firm*—Oblon, Spivak, McClelland, Maier & Neustadt, P.C.

(57) ABSTRACT

A photoreceptor including an electroconductive substrate; an undercoat layer located overlying the electroconductive substrate and including titanium oxide which has an average particle diameter greater than 0.05 μm and less than 0.20 μm and which includes rutile titanium oxide in an amount of from 10 to 100% by weight based on total weight of the titanium oxide; and a photosensitive layer located overlying the undercoat layer.

18 Claims, 3 Drawing Sheets

COATING LIQUID FOR ELECTROPHOTOGRAPHIC PHOTORECEPTOR, ELECTROPHOTOGRAPHIC PHOTORECEPTOR, AND IMAGE FORMING METHOD AND APPARATUS USING THE PHOTORECEPTOR

This application is a Divisional application of U.S. Ser. No. 10/244,444 filed on Sep. 17, 2002, now U.S. Pat. No. 6,864,027.

BACKGROUND OF THE INVENTION

1. Field of the Invention

The present invention relates to a coating liquid for an electrophotographic photoreceptor, an electrophotographic photoreceptor which is prepared using the coating liquid, and electrophotographic image forming method and apparatus using the electrophotographic photoreceptor. In addition, the present invention also relates to an electrophotographic process cartridge using the electrophotographic photoreceptor.

2. Discussion of the Background

Conventionally, inorganic photosensitive materials such as Se, CdS and ZnO have been used for electrophotographic photoreceptors. In addition, organic photosensitive materials have been developed and used for electrophotographic photoreceptors because of having advantages of high photosensitivity and heat stability and less toxicity over the inorganic photosensitive materials. Therefore, at the present time photoreceptors using an organic photosensitive material are typically used for current copiers and printers.

In electrophotographic image forming apparatus such as printers, copiers and facsimiles, a series of image forming processes such as charging, light irradiating, developing and transferring processes is typically performed. Such image forming apparatus at least includes a charger, an imagewise light irradiator, an image developer (particularly, a reverse image developer), a transfer device and a photoreceptor. The image forming apparatus having such a constitution tend to produce abnormal images after long repeated use.

Recently, digitization rapidly progresses and is applied to image forming apparatus such as printers and copiers. Therefore, photoreceptors which are sensitive to laser light (i.e., monochromatic light) emitted by a laser diode, are needed to be used for such digital image forming apparatus. Not to produce abnormal images such as moiré is one of the requisites of the photoreceptors, and an undercoat layer formed between an electroconductive substrate and a photosensitive layer plays a important role in preventing the moiré problem. For example, a technique in which a particulate metal oxide or a particulate organic material is included in an undercoat layer is proposed to prevent the moiré problem.

The following techniques have been proposed with respect to the undercoat layer.

(1) Japanese Laid-Open Patent Publication No. (hereinafter referred to as JOP) 11-15181 discloses a photoreceptor which includes an aluminum or aluminum alloy substrate having a surface which is subjected to an anodizing treatment, followed by a mechanical polishing treatment and a sealing treatment using hot water or a sealing treatment while humidifying, and a photosensitive layer located on the substrate;

(2) JOP 10-301314 discloses a photoreceptor which has an electroconductive substrate, and an undercoat layer and a photosensitive layer, which are overlaid on the substrate, wherein a composition in which a kind of organoalkoxy siloxane is mixed with a colloidal alumina and which is crosslinked upon application of heat thereto is used as the undercoat layer;

(3) JOP 10-90931 discloses a photoreceptor which has an electroconductive substrate, and an undercoat layer and a photosensitive layer, which are overlaid on the substrate, wherein the undercoat layer includes a resin and titanium oxide subjected to a heat treatment;

(4) JOP 5-204181 discloses a photoreceptor which has a substrate, and an electroconductive polyaniline layer and a photosensitive layer, which are overlaid on the substrate; and (5) JOP 8-44096 discloses a photoreceptor which has a substrate, and an undercoat layer and a photosensitive layer, which are overlaid on the substrate, wherein the undercoat layer includes a heat-crosslinked resin at a volume content ratio of from 0.5 to 0.6 and titanium oxide having an average particle diamter not greater than 0.4 μm;

(6) JOP 9-34152 discloses a photoreceptor which has an electroconductive substrate, and an undercoat layer and a photosensitive layer, which are overlaid on the substrate, wherein the substrate is made of aluminum, an Al—Mn alloy, an Al—Mg alloy or an Al—Mg—Si alloy, and the undercoat layer includes a compound selected from the group consisting of metal alkoxides, organic metal chelate compounds, silane coupling agents and reaction products thereof;

(7) JOP 9-292730 discloses a photoreceptor for reverse development in which a photosensitive layer is formed on an anodized surface of an electroconductive substrate made of aluminum or an aluminum alloy, wherein the anodized surface has a profile in which an interval Sm between a projected portion and an adjacent projected portion is from 0.3 to 250 μm; the maximum height Rt of the projected portions is from 0.5 to 2.5 μm; and the gloss of the anodized surface is not less than 60 gloss; and (8) JOP 10-83093 discloses a photoreceptor in which an undercoat layer is formed between an electroconductive substrate and a photosensitive layer, wherein the undercoat layer includes a particulate titanium oxide having a surface including at least zirconium oxide.

In the above-mentioned photoreceptors (1) to (8), various constitutions and/or materials are applied to the undercoat layer or an anodic oxide layer is applied as the undercoat layer to prevent injection of holes into a photosensitive layer (or a charge generation layer), resulting in prevention of occurrence of black spot images. However, the above-mentioned photoreceptors are not satisfactory because recently photoreceptors do not meet the current requirements therefor, such as producing high quality images and having high durability.

As mentioned above, photoreceptors are needed not to produce moiré which is caused by light interference. In order to avoid the moiré problem, photoreceptors including a metal oxide such as titanium oxide in their undercoat layer are typically used.

An undercoat layer including titanium oxide is typically formed by coating a coating liquid, in which titanium oxide is dispersed in a resin and a dispersion medium, on an electroconductive substrate. Since metal oxides such as titanium oxide have a specific gravity much greater than a resin and a dispersion medium used in the coating liquid, the dispersion stability and coating properties of the resultant coating liquids are typically poor. Therefore a uniform undercoat layer cannot be formed because metal oxides included in the coating liquids tend to easily aggregate. Therefore, aggregated particles tend to be included in the resultant undercoat layers. Alternatively there is a problem in that the productivity of the coating liquids is low because such coating liquids as including an aggregated metal oxide are typically disposed of.

Because of these reasons, a need exists for an electrophotographic photoreceptor which can produce high quality images for a long period of time without producing abnormal images such as black spots.

SUMMARY OF THE INVENTION

It is an object of the present invention to provide an undercoat layer coating liquid which can form an undercoat layer without producing coating defects such as pinholes.

Another object of the present invention is to provide a photoreceptor which can produce high quality images for a long period of time without producing abnormal images such as black spots.

Yet another object of the present invention is to provide an image forming method, an image forming apparatus and a process cartridge, by which high quality images can be produced for a long period of time without producing abnormal images such as black spots.

Briefly these objects and other objects of the present invention as hereinafter will become more readily apparent can be attained by a coating liquid including at least a binder resin, titanium oxide and an organic solvent, wherein the titanium oxide includes rutile titanium oxide in an amount of from 10 to 100% by weight based on total weight of the titanium oxide, and wherein the titanium oxide is dispersed in the coating liquid and has an average particle diameter (R) greater than 0.05 μm and less than 0.20 μm, and.

The purity of the titanium oxide is preferably not less than 99.0%.

The content of rutile titanium oxide is preferably from 10 to 70% and more preferably from 30 to 70%.

In another aspect of the present invention, an electrophotographic photoreceptor is provided which includes an electroconductive substrate, an undercoat layer located overlying the substrate and a photosensitive layer located overlying the undercoat layer, wherein the undercoat layer includes a binder resin and titanium oxide, and wherein the titanium oxide included in the undercoat layer has an average particle diameter (R) greater than 0.05 μm and less than 0.20 μm, and includes rutile titanium oxide in an amount of from 10 to 100% by weight based on total weight of the titanium oxide.

The purity of the titanium oxide is preferably not less than 99.0%.

The content of rutile titanium oxide is preferably from 10 to 70% and more preferably from 30 to 70%.

The photosensitive layer preferably includes a charge generation layer and a charge transport layer, which are overlaid.

In yet another aspect of the present invention, an image forming method is provided which includes the steps of charging the photoreceptor of the present invention mentioned above; irradiating the photoreceptor with imagewise light to form an electrostatic latent image on the photoreceptor; developing the electrostatic latent image with a developer to form a toner image on the photoreceptor; and transferring the toner image on a receiving material, wherein the irradiating step is performed using light emitted a laser diode or light emitting diode, and wherein the developing step is performed using a reverse developing method.

In a further aspect of the present invention, an image

In a further aspect of the present invention, an image forming apparatus is provided which includes at least a charger, a light irradiator, an image developer, an image transfer device, a discharger and the photoreceptor of the present invention.

In a still further aspect of the present invention, a process cartridge is provided which includes at least the photoreceptor of the present invention and at least one of a charger, a light irradiator, an image developer, an image transfer device and a discharger.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be better understood from the detailed description when considered in connection with the accompanying drawings in which like reference characters designate like corresponding parts throughout and wherein.

DETAILED DESCRIPTION OF THE INVENTION

Figure 1:
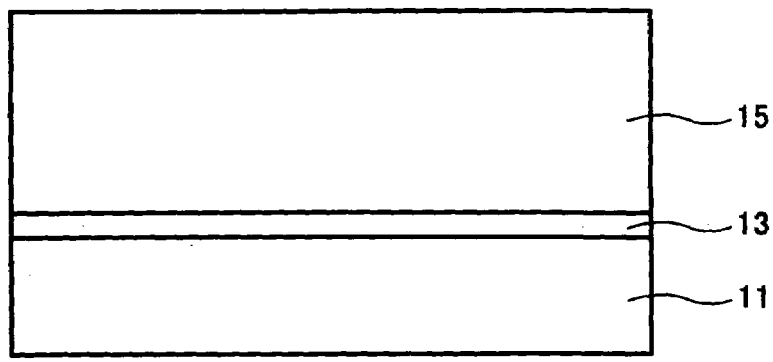
FIG. 1 is a schematic view illustrating the cross section of an embodiment of the photoreceptor of the present invention.

At first, titanium oxide for use in the coating liquid of the present invention will be explained in detail.

The titanium oxide for use in the coating liquid of the present invention, which has an average particle diameter (R) greater than 0.05 μm and less than 0.20 μm are typically prepared by a method using chlorine. Namely, a titan slag which is a raw material of titanium oxide is chlorinated to prepare titanium tetrachloride. Then the thus prepared product is subjected to a separation treatment, a condensation treatment and a purification treatment, and then oxidized to prepare raw titanium oxide.

The thus prepared raw titanium oxide is pulverized and classified to prepare titanium oxide for use in the present invention. The raw titanium oxide is optionally subjected to a surface treatment. In this case, the surface-treated titanium oxide is filtered and the cake is washed and then dried. The dried surface-treated titanium oxide powder is pulverized to prepare titanium oxide which has a treated surface and which is for use in the coating liquid of the present invention.

In order to prepare such titanium oxide as having a desired average particle diameter R (i.e., 0.05 μm<R<0.20 μm), the primary particle diameter of the raw titanium oxide should be controlled when the titanium tetrachloride is oxidized.

By using the thus prepared titanium oxide in an undercoat layer coating liquid, the resulting coating film (i.e., the undercoat layer) has good hiding power, i.e., an undercoat layer can be formed on the surface of an electroconductive substrate without forming pinholes in the undercoat layer. In addition, the precipitation speed of the titanium oxide in the undercoat layer coating liquid is very slow, and thereby the undercoat layer coating liquid does not cause a precipitation problem. Namely, the undercoat layer coating liquid of the present invention has good preservation properties.

When the titanium oxide used in the undercoat layer has a particle diameter smaller than 0.05 μm, the titanium oxide tends to have a high activity at the surface thereof, and thereby the electrostatic properties of the resultant photoreceptor deteriorate.

When the titanium oxide used in the undercoat layer has a particle diameter greater than 0.20 μm, the titanium oxide in the coating liquid tends to easily precipitate, i.e., the stability of the coating liquid deteriorates. In addition, pinholes tend to be formed in the resultant undercoat layer. In the present invention, the particle diameter distribution of titanium oxide is measured with respect to a dispersion in which the titanium oxide is strongly dispersed in water.

In the present invention, the purity of titanium oxide mainly depends on the factors such as the purity of the raw material, the manufacturing method used, whether or not the titanium oxide is subjected to a surface treatment, and the degree of the surface treatment (i.e., the quantity of the surface treatment agent adhered to the titanium oxide). When the method using chlorine is used, high-purity titanium oxide can be prepared.

Titanium oxide for use in the coating liquid of the present invention preferably has a purity not less than 99.0%. Hygroscopic materials such as $Na_2O$ and $K_2O$, and ionic materials are typically included in titanium oxide as impurities. When the purity of the titanium oxide used in the undercoat layer is less than 99.0%, the electrostatic properties of the resultant photoreceptor tend to largely vary particularly when the photoreceptor is used under high humidity conditions and/or repeatedly used for a long period of time. Such impurities cause image defects such as black spots.

In the present invention, the purity of titanium oxide is determined based on JIS K5116.

In addition, the titanium oxide for use in the undercoat layer preferably includes rutile-form titanium oxide in an amount of from 10 to 100% by weight based on total weight of the titanium oxide. In general, titanium oxide has a crystal as specific gravity, refractive index and hardness thereof are different. The crystal form, anatase or rutile, of titanium oxide depends on the sintering conditions when the titanium oxide is prepared. When sintered under a mild condition, the resultant titanium oxide tends to have an anatase form, and as the sintering temperature is increased, the crystal form is changed to a rutile form. Therefore, by controlling the sintering conditions, the titanium oxide for use in the present invention, i.e., titanium oxide including rutile form titanium oxide at a desired content (i.e., from 10 to 100%, preferably from 10 to 70%, and more preferably from 30 to 70%), can be prepared.

The reason why the titanium oxide including rutile form titanium oxide at a proper content are preferable in the present invention is not yet determined, but by using such titanium oxide, occurrence of image defects such as background development (background fouling) can be avoided.

In the present invention, the content of rutile titanium oxide in titanium oxide can be determined by an X-ray diffraction method. Specifically, the content of rutile titanium oxide (hereinafter referred to as the rutile titanium oxide content) can be determined by comparing the intensity of a peak of the X-ray diffraction spectrum specific to rutile titanium oxide with the intensity of another peak specific to anatase titanium oxide.

The method for measuring the rutile titanium oxide content is as follows:

1. Each of mixtures of a hundred-percent rutile titanium oxide with a hundred-percent anatase titanium oxide which are fully mixed at predetermined ratios is subject to an X-ray diffraction analysis to prepare a working curve illustrating a relationship between rutile titanium oxide contents and X-ray peak ratios (Ratio); and
2. a titanium oxide sample is subjected to the X-ray diffraction analysis to determine the rutile titanium oxide content of the sample using the working curve.

The Ratio is determined as follows:

(1) in the X-ray diffraction spectrum, the net integral strength (NET(R)) of a peak specific to anatase titanium located at an angle of from 24.80° to 25.80° and the net integral strength (NET(A)) of a peak specific to rutile titanium located at an angle of from 26.70° to 28.20° are determined; and
(2) the Ratio is determined by the following equation:

$$Ratio=NET(R)/\{NET(R)+NET(A)\}.$$

Then the photoreceptor of the present invention will be explained in detail referring to drawings.

FIG. 1 is a schematic view illustrating the cross section of an embodiment of the photoreceptor of the present invention.

The photoreceptor includes an electroconductive substrate 11, an undercoat layer 13 which is located on the electroconductive substrate 11 and which includes a titanium oxide, and a photosensitive layer 15 located on the undercoat layer 13. layer 13.

Figure 2:
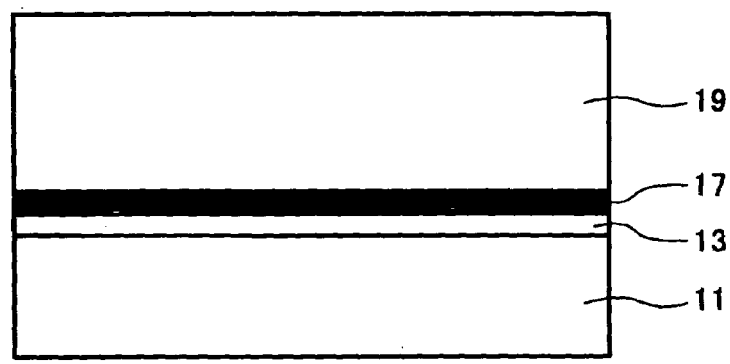
FIG. 2 is a schematic view illustrating the cross section of an embodiment of the photoreceptor of the present invention, which has a layered photosensitive layer.

FIG. 2 is a schematic view illustrating the cross section of another embodiment of the photoreceptor of the present invention.

The photoreceptor includes an electroconductive substrate 11, an undercoat layer 13 which is located on the electroconductive substrate 11 and which includes titanium oxide, and a charge generation layer 17 and a charge transport layer 19 are overlaid on the undercoat layer 13.

Figure 3:
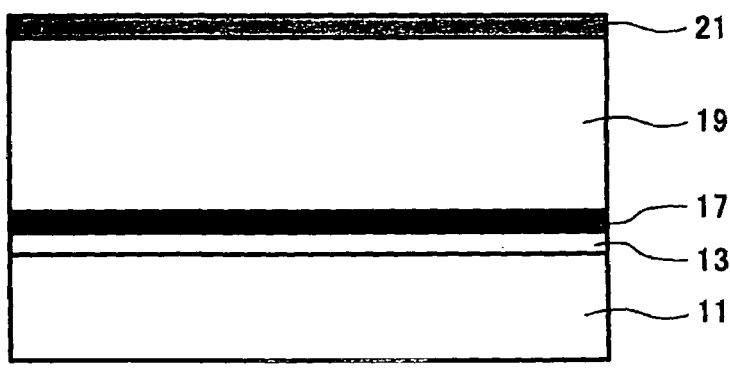
FIG. 3 is a schematic view illustrating the cross section of another embodiment of the photoreceptor of the present invention, which has a layered photosensitive layer and a protective layer.

FIG. 3 is a schematic view illustrating the cross section of yet another embodiment of the photoreceptor of the present invention.

As illustrated in FIG. 3, a protective layer 21 can be formed on the charge transport layer 19 of the photoreceptor illustrated in FIG. 2.

Suitable materials for use as the electroconductive substrate 11 include materials having a volume resistance not greater than $10^{10}$ Ω·cm. Specific examples of such materials include plastic cylinders, plastic films or paper sheets, on the surface of which a metal such as aluminum, nickel, chromium, nichrome, copper, gold, silver, platinum and the like, or a metal oxide such as tin oxides, indium oxides and the like, is deposited or sputtered. In addition, as the substrate 11, a sheet of nickel, stainless steel or the like metal, and a tube which is prepared by tubing a metal such as aluminum, nickel, stainless steel or the like metal using a method such as impact ironing or direct ironing, followed by a surface treatment such as cutting, super finishing, polishing and the like can also be used. In addition, tubes which are made of an aluminum alloy such as JIS3003 type aluminum alloys, JIS5000 type aluminum alloys, JIS6000 type aluminum alloys and the like aluminum alloys and which are formed by a method such as extrude ironing (EI) methods, extrude drawing (ED) methods, direct ironing (DI) methods and impact ironing (II) methods, optionally followed by a surface cutting treatment using a diamond cutting tool, a surface polishing treatment and/or an anodizing treatment, can also be used.

Further, endless belts of a metal such as nickel, stainless steel and the like metal, which have been disclosed, for example, in Japanese Laid-Open Patent Publication No. 52-36016, can also be used as the substrate 11.

Furthermore, substrates, in which a coating liquid including a binder resin and an electroconductive powder is coated on the supports mentioned above, can be used as the substrate 11. Specific examples of the electroconductive powder include carbon black, acetylene black, powders of metals such as aluminum, nickel, iron, nichrome, copper, zinc, silver and the like, and metal oxides such as electroconductive tin oxides, ITO and the like. Specific examples of the binder resin include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like.

Such an electroconductive layer can be formed by coating a coating liquid in which an electroconductive powder and a binder resin are dispersed or dissolved in a proper solvent such as tetrahydrofuran, dichloromethane, methyl ethyl ketone, toluene and the like, and then drying the coated liquid.

In addition, substrates, in which an electroconductive resin film is formed on a surface of a cylindrical substrate using a heat-shrinkable resin tube which is made of a combination of a resin such as polyvinyl chloride, polypropylene, polyesters, polyvinylidene chloride, polyethylene, chlorinated rubber and fluorine-containing resins, with one or more of the electroconductive materials mentioned above, can also used as the substrate 11.

The undercoat layer 13 includes titanium oxide and a resin as main components. Since the photosensitive layer (e.g., the photosensitive layer 15 in FIG. 1 or the charge generation layer 17 in FIGS. 2 and 3) is typically formed on the undercoat layer by coating a liquid including an organic solvent, the resin included in the undercoat layer preferably has good resistance to general organic solvents.

Specific examples of such resins include water-soluble resins such as polyvinyl alcohol resins, casein and polyacrylic acid sodium salts; alcohol soluble resins such as nylon copolymers and methoxymethylated nylon resins; and thermosetting resins capable of forming a three-dimensional network such as polyurethane resins, melamine resins, phenolic resins, alkyd-melamine resins, epoxy resins and the like resins.

The weight ratio (T/R) of the titanium oxide (T) to the resin (R) in the undercoat layer is preferably from 3/1 to 8/1. When the weight ratio is too small, the carrier transportability of the undercoat layer deteriorates, resulting in increase of the residual potential of the resultant photoreceptor and deterioration of the photo-response thereof. In contrast, when the weight ratio is too large, the undercoat layer has many air spaces, and thereby air bubbles are formed when a photosensitive layer coating liquid is coated on the undercoat layer, resulting in formation of coating defects in the photosensitive layer.

Similarly to the photosensitive layer mentioned below, the undercoat layer 13 can be formed by coating a coating liquid including a resin, titanium oxide and a proper solvent using a proper coating method.

The thickness of the undercoat layer 13 is preferably from 1.0 to 10 μm.

Then the photosensitive layer will be explained.

The charge generation layer 17 includes a charge generation material, and a binder resin as necessary.

Specific examples of the binder resin include polyamide, polyurethane, epoxy resins, polyketone, polycarbonate, silicone resins, acrylic resins, polyvinyl butyral, polyvinyl formal, polyvinyl ketone, polystyrene, polysulfone, poly-N-vinylcarbazole, polyacrylamide, polyvinyl benzal, polyester, phenoxy resins, vinyl chloride-vinyl acetate copolymers, polyvinyl acetate, polyphenylene oxide, polyamides, polyvinyl pyridine, cellulose resins, casein, polyvinyl alcohol, polyvinyl pyrrolidone, and the like resins.

The addition amount of the binder resin is from 0 to 500 parts by weight, and preferably from 10 to 300 parts by weight, per 100 parts by weight of the charge generation material included in the charge generation layer.

Specific examples of the charge generation materials include phthalocyanine pigments such as metal phthalocyanine and metal-free phthalocyanine, azulenium pigments, squaric acid methine pigments, perylene pigments, anthraquinone pigments, polycyclic quinone pigments, quinoneimine pigments, diphenyl methane pigments, triphenyl methane pigments, benzoquinone pigments, naphthoquinone pigments, cyanine pigments, azomethine pigments, indigoid pigments, bisbenzimidazole pigments, and azo pigments such as monoazo pigments, bisazo pigments, asymmetric bisazo pigments, trisazo pigments and tetraazo pigments.

Specific examples of the azo pigments include azo pigments having a carbazole skeleton (disclosed in JOP 53-95033), azo pigments having a triphenylamine skeleton (disclosed in JOP 53-132547), azo pigments having a stilbene skeleton (disclosed in JOP 53-138229), azo pigments having a dibenzothiophene skeleton (disclosed in JOP 54-21728), azo pigments having a fluorenone skeleton (disclosed in JOP 54-22834), azo pigments having an oxadiazole skeleton (disclosed in JOP 54-12742), azo pigments having a bisstilbene skeleton (disclosed in JOP 54-17733), azo pigments having a distyryloxadiazole skeleton (disclosed in JOP 54-2129), azo pigments having a distyrylcarbazole skeleton (disclosed in JOP 54-17734), and the like pigments.

The charge generation layer 17 is prepared by, for example, the following steps:
(1) preparing a coating liquid by mixing one or more charge generation materials mentioned above with a solvent such as isopropanol, aceton, methyl ethyl ketone, cyclohexanone, tetrahydrofuran, dioxane, dioxolan, ethyl cellosolve, ethyl acetate, methyl acetate, dichloromethane, dichloroethane, monochlorobenzene, cyclohexane, xylene, ligroin and the like, optionally together with a binder resin and an additive, and then dispersing the materials with a ball mill, an attritor, a sand mill, an ultrasonic dispersing machine or the like dispersing machine;

(2) coating on a substrate the coating liquid, which may be diluted as necessary, using a dip coating method, a spray coating method, a bead coating method, a nozzle coating method, a spinner coating method, a ring coating method or the like method; and (3) drying the coated liquid to form a charge generation layer.

The thickness of the charge generation layer 17 is preferably from about 0.01 to about 5 μm, and more preferably from about 0.1 to about 2 μm.

Then the charge transport layer 19 will be explained.

The charge transport layer 19 includes a charge transport material as a main component.

The charge transport layer 19 can be formed, for example, by the following method:

(1) a charge transport material and a binder resin are dispersed or dissolved in a proper solvent such as tetrahydrofuran, dioxane, dioxolan, anisole, toluene, monochlorobenzene, dichloroethane, methylene chloride, cyclohexanone or the like solvent, to prepare a charge transport layer coating liquid; and (2) coating the charge transport layer coating liquid on the charge generation layer and drying the coated liquid, to form a charge transport layer.

Charge transport materials are classified into positive-hole transport materials and electron transport materials.

Specific examples of the electron transport materials include electron accepting materials such as chloranil, bromanil, tetracyanoethylene, tetracyanoquinodimethane, 2,4,7-trinitro-9-fluorenon, 2,4,5,7-tetanitroxanthone, 2,4,8-trinitrothioxanthone, 2,6,8-trinitro-4H-indeno[1,2-b]thiophene-4-one, 1,3,7-trinitrodibenzothiphene-5,5-dioxide, 3,5-dimethyl-3',5'-di-tert-butyl-4,4'-diphenoquinone and the like materials. These electron transport materials can be used alone or in combination.

Specific examples of the positive-hole transport materials include known materials such as poly-N-vinylcarbazole and its derivatives, poly-γ-carbazolylethylglutamate and its derivatives, pyrene-formaldehyde condensation products and their derivatives, polyvinyl pyrene, polyvinyl phenanthrene, polysilane, oxazole derivatives, oxadiazole derivatives, imidazole derivatives, monoarylamines derivatives, diarylamines derivatives, triarylamines derivatives, stilbene derivatives, α-phenyl stilbene derivatives, benzidine derivatives, diarylmethane derivatives, triarylmethane derivatives, 9-styrylanthracene derivatives, pyrazoline derivatives, divinyl benzene derivatives, hydrazone derivatives, indene derivatives, butadiene derivatives, pyrene derivatives, bis-stilbene derivatives, enamine derivatives, thiazole derivatives, triazole derivatives, phenazine derivatives, acridine derivatives, benzofuran derivatives, benzimidazole derivatives, thiophene derivatives and the like materials.

These positive hole transport materials can be used alone or in combination.

Specific examples of the binder resin for use in the charge transport layer include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates (e.g., bisphenol A-form polycarbonates and bisphenol Z-form polycarbonates), cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins, and polycarbonate copolymers disclosed in JOPs 5-158250 and 6-51544.

In addition, charge transport polymers, which have both a binder function and a charge transport function, can also be used as the binder resin in the charge transport layer 19.

Specific examples of such charge transport polymers include the following.

(a) polymers having a carbazole ring in their main chain and/or a side chain, such as poly-N-vinylcarbazole, and polymers disclosed in JOPs 50-82056, 54-9632, 54-11737, and 4-183719;

(b) polymers having a hydrazone unit in their main chain and/or a side chain, such as polymers disclosed in JOPs 57-78402, and 3-50555;

(c) polysilylene polymers such as polymers disclosed in JOPs 63-285552, 5-19497 and 5-70595; and (d) polymers having a tertiary amine unit in their main chain and/or a side chain, such as N,N-bis(4-methylphenyl)-4-amino polystyrene, and polymers disclosed in JOPs 1-13061, 1-19049, 1-1728, 1-105260, 2-167335, 5-66598, and 5-40350.

The addition amount of the binder resin is preferably from 0 to 150 parts by weight per 100 parts by weight of the charge transport material included in the charge transport layer.

The charge transport layer optionally includes one or more additives such as plasticizers, leveling agents and antioxidants.

Specific examples of the plasticizers include halogenated paraffins, dimethyl naphthalene, dibutyl phthalate, dioctyl phthalate, tricresyl phosphate, and polymers and copolymers such as polyesters.

Specific examples of the leveling agents include silicone oils such as dimethyl silicone oils and methylphenyl silicone oils, and polymers and oligomers having a perfluoroalkyl group in their side chain. The addition amount of the leveling agents is from 0 to 1 part by weight per 100 parts by weight of the binder resin included in the charge transport layer.

Specific examples of the antioxidants include hindered phenol compounds, sulfur-containing compounds, phosphorus-containing compounds, hindered amines, pyridine derivatives, piperidine derivatives, morpholine derivatives, and the like materials. The addition amount of the antioxidant is preferably from 0 to 5 parts by weight per 100 parts by weight of the binder resin included in the charge transport layer.

The thickness of the charge transport layer 19 is preferably from 5 to 50 μm.

Next, the single-layered photosensitive layer 15 will be explained.

The single-layered photosensitive layer 15 includes a charge generation material, a charge transport material and a binder resin as main components. The photosensitive layer can be formed by coating a coating liquid in which a charge generation material, a charge transport material and a binder resin are dissolved or dispersed in a proper solvent such as tetrahydrofuran, cyclohexanone, dioxane, dichlotoethane and butanone, using a dispersion machine such as ball mills, attritors and sand mills, and then drying the coated liquid. Specific examples of the coating method include dipping methods, spray coating methods, roll coating methods, blade coating methods and the like coating methods.

Suitable binder resins for use in the single-layered photosensitive layer include the resins mentioned above for use in the charge transport layer. The resins mentioned above for use in the charge generation layer can also be used in combination with the resins mentioned above for use in the charge transport layer.

In addition, a photosensitive layer including a combination of an eutectic complex including a pyrylium dye and a bisphenol A-form polycarbonate resin with a charge transport material can also be used as the single-layered photosensitive layer. This layer can also be formed by a method similar to the method mentioned above.

The single-layered photosensitive layer may also include one or more additives such as plasticizers, leveling agents and antioxidants. Specific examples thereof are mentioned above.

The thickness of the single-layered photosensitive layer is preferably from 5 or 50 µm.

In the photoreceptor of the present invention, the protective layer 21 is formed overlying the photosensitive layer (e.g., the photosensitive layer 15 and charge transport layer 19) as an outermost layer to improve the durability of the photoreceptor.

The protective layer includes a resin as a main component.

Specific examples of the resins for use in the protective layer 21 include ABS resins, ACS resins, olefin-vinyl monomer copolymers, chlorinated polyethers, aryl resins, phenolic resins, polyacetal, polyamides, polyamideimide, polyacrylates, polyarylsulfone, polybutylene, polybutylene terephthalate, polycarbonate, polyethersulfone, polyethylene, polyethylene terephthalate, polyimides, acrylic resins, polymethylpentene, polypropylene, polyphenyleneoxide, polysulfone, polystyrene, AS resins, butadiene-styrene copolymers, polyurethane, polyvinyl chloride, polyvinylidene chloride, epoxy resins, polyesters and the like resins.

The protective layer preferably includes a filler such as organic fillers and inorganic fillers to improve the abrasion resistance of the photoreceptor.

Specific examples of the organic fillers include powders of fluorine-containing resins such as polytetrafluoroethylene, silicone resin powders and the like powders. Specific examples of the inorganic fillers include titanium oxide, aluminum oxide, tin oxide, zinc oxide, zirconium oxide, magnesium oxide, silica and the like inorganic materials. The inorganic fillers may be subjected to a surface treatment.

In addition, the protective layer may include a charge transport material.

The protective layer can be formed by the method as mentioned above for use in the charge transport layer and photosensitive layer. The thickness of the protective layer is preferably from 0.1 to 10 µm.

In addition, a layer of amorphous carbon or amorphous silicon carbide which is formed by a vacuum thin film forming method can also be used as the protective layer 21.

The photoreceptor of the present invention may include an intermediate layer between the photosensitive layer (e.g., the photosensitive layer 15 or charge transport layer 19) and the protective layer 21. The intermediate layer includes a resin as a main component. Specific examples of the resin include polyamides, alcohol-soluble nylon resins, water-soluble butyral resins, polyvinyl butyrals, polyvinyl alcohols, and the like resins.

The intermediate layer is also formed by the method mentioned above for use in the charge transport layer, photosensitive layer and protective layer.

The thickness of the intermediate layer is preferably from 0.05 to 2 µm.

The electrophotographic image forming apparatus and process cartridge of the present invention will be explained referring to drawings.

Figure 4:
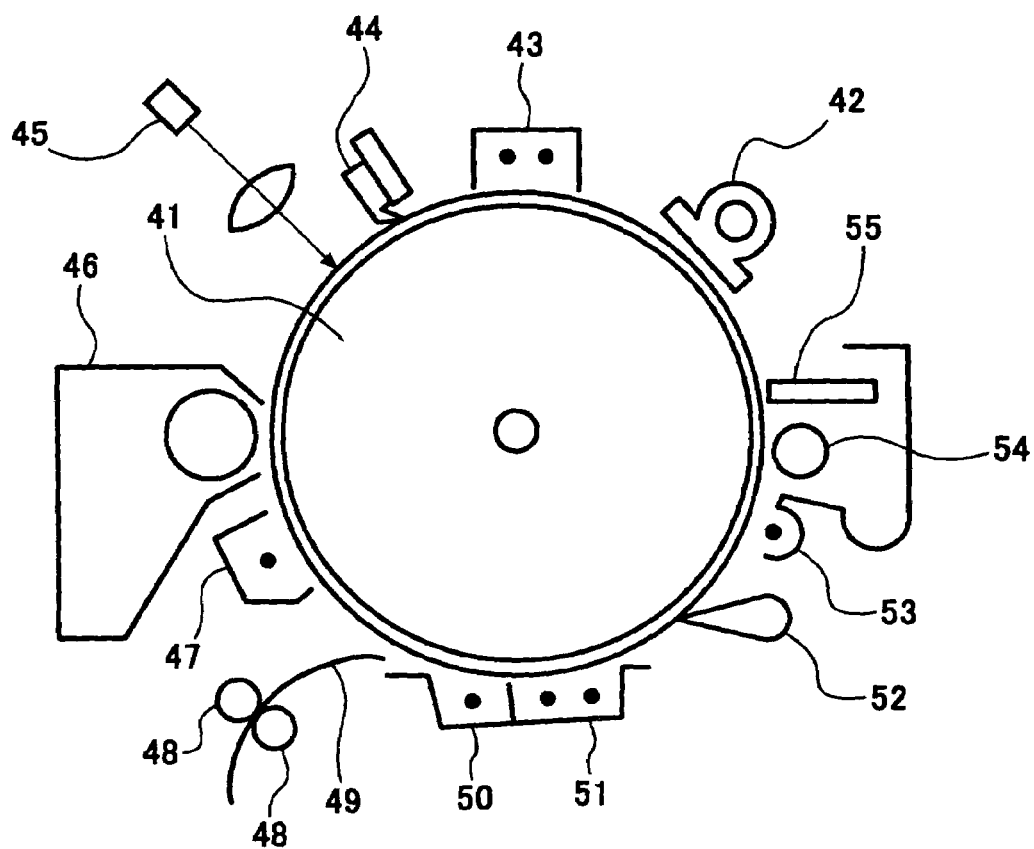
FIG. 4 is a schematic view illustrating the main part of an embodiment of the image forming apparatus of the present invention.

FIG. 4 is a schematic view illustrating an embodiment of the image forming apparatus of the present invention.

In FIG. 4, numeral 41 denotes a photoreceptor. The photoreceptor 41 is the photoreceptor of the present invention which includes at least an electroconductive substrate, an undercoat layer which is formed overlying the substrate by coating the coating liquid of the present invention, and a photosensitive layer located overlying the undercoat layer.

Around the photoreceptor 41, a discharging lamp 42 configured to irradiate the photoreceptor with light to reduce the residual potential of the photoreceptor 41, a charger 43 configured to charge the photoreceptor 1, an eraser 44 configured to erase a charged area which is unnecessary, an imagewise light irradiator 45 configured to irradiate the photoreceptor 41 with imagewise light to form an electrostatic latent image on the photoreceptor 41, an image developer 46 configured to develop the latent image with a developer including a toner to form a toner image on the photoreceptor 41, a cleaning unit including a cleaning brush 54 and a cleaning blade 55 configured to clean the surface of the photoreceptor 41 are arranged while contacting or being set closely to the photoreceptor 41.

The toner image formed on the photoreceptor 41 is transferred on a receiving paper 49 fed by a pair of registration rollers 48 at a transfer device (i.e., a pair of a transfer charger 50 and a separating charger 51). The receiving paper 49 having the toner image thereon is separated from the photoreceptor 41 by a separating pick 52.

In the image forming apparatus of the present invention, a pre-transfer charger 47 and a pre-cleaning charger 53 may be arranged if desired.

Although the photoreceptor 41 has a cylindrical shape in FIG. 4, sheet photoreceptors or endless belt photoreceptors can also be used.

As the charger 43, the pre-transfer charger 47, the transfer charger 50, the separating charger 51 and the pre-cleaning charger 53, all known chargers such as corotrons, scorotrons, solid state chargers, roller chargers and brush chargers can be used.

As the transfer device, the above-mentioned chargers can be used.

In FIG. 4, a toner image formed on the photoreceptor 41 is directly transferred onto the receiving paper 49. However, the toner image on the photoreceptor 41 may be transferred onto an intermediate transfer medium and then secondly transferred onto a receiving paper.

Suitable light sources for use in the imagewise light irradiator 45 and the discharging lamp 42 include fluorescent lamps, tungsten lamps, halogen lamps, mercury lamps, sodium lamps, light emitting diodes (LEDs), laser diodes (LDs), light sources using electroluminescence (EL), and the like. In addition, in order to obtain light having a desired wave length range, filters such as sharp-cut filters, band pass filters, near-infrared cutting filters, dichroic filters, interference filters, color temperature converting filters and the like can be used.

The above-mentioned lamps can be used for not only the processes mentioned above and illustrated in FIG. 4, but also other processes using light irradiation, such as a transfer process including light irradiation, a discharging process, a cleaning process including light irradiation and a pre-exposure process.

When the toner image formed on the photoreceptor 41 by the image developer 46 is transferred onto the receiving paper 49, all of the toner image are not transferred on the receiving paper 49, and residual toner particles remain on the surface of the photoreceptor 41. The residual toner is removed from the photoreceptor 41 by the fur brush 54 or the cleaning blade 55. The residual toner remaining on the photoreceptor 41 can be removed by only a cleaning brush. Suitable cleaning brushes include known cleaning brushes such as fur brushes and mag-fur brushes. However, when the image developer has a cleaning function, it is not necessary to provide the cleaning brush 54 and the cleaning blade 55.

When the photoreceptor 41 which is previously charged positively (or negatively) is exposed to imagewise light, an electrostatic latent image having a positive (or negative) charge is formed on the photoreceptor 41. When a latent image having a positive (or negative) charge is developed with a toner having a negative (or positive) charge, a positive image can be obtained. In contrast, when a latent image having a positive (or negative) charge is developed with a toner having a positive (or negative) charge, a negative image (i.e., a reversal image) can be obtained.

As the image developer 46, known developing devices can be used.

The image forming apparatus illustrated in FIG. 4 is only one example of the image forming apparatus of the invention, and the image forming apparatus of the invention is not limited thereto.

For example, an image forming unit may be set in copiers, facsimile machines and printers, as a process cartridge. The process cartridge means an image forming unit (or device) which includes at least a photoreceptor, and at least one of a charger, an imagewise light irradiator, an image developer, an image transfer device, a cleaner, and a discharger.

Figure 5:
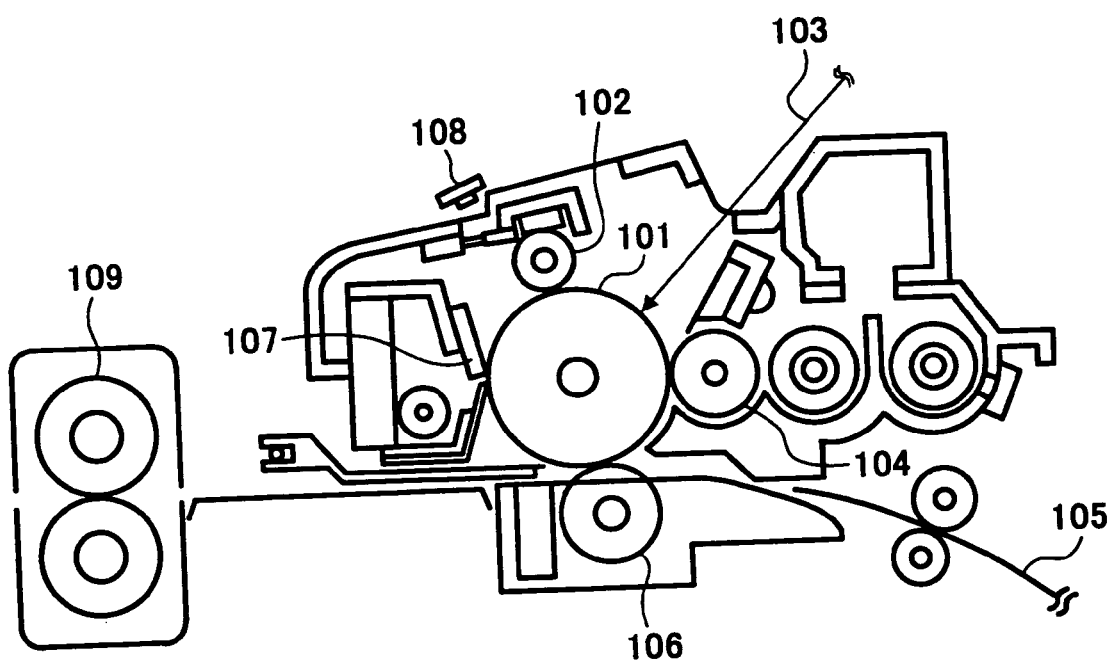
FIG. 5 is a schematic view illustrating the main part of an embodiment of the process cartridge of the present invention.

Various process cartridges can be used in the present invention. An embodiment of the process cartridge of the present invention is illustrated in FIG. 5. In FIG. 5, numeral 101 denotes the photoreceptor of the present invention. Similarly to the image forming apparatus as illustrated in FIG. 4, a charger 102 configured to charge the photoreceptor 101; an imagewise light irradiator 103 configured to irradiate the photoreceptor 101 with imagewise light to form an electrostatic latent image on the photoreceptor 101; an image developer 104 configured to develop the electrostatic latent image with a developer including a toner to form a toner image on the photoreceptor 101; an image transfer device 106 configured to transfer the toner image on a receiving material 105 such as paper; a cleaner 107 configured to remove the residual toner on the photoreceptor 101; and a discharge lamp 108 configured to remove the residual potential remaining on the photoreceptor 101, are arranged around the photoreceptor 101. Numeral 109 denotes a fixer configured to fix the toner image, resulting in formation of a hard copy.

The receiving material 105, image transfer device 106, discharge lamp 108 and fixer 109 are not included in this process cartridge. As the light irradiation processes, imagewise light irradiation, pre-cleaning light irradiation, and discharging light irradiation are illustrated in FIG. 5, but other known light irradiation processes such as pre-transfer light irradiation, preliminary light irradiation prior to the imagewise light irradiation can also be performed on the photoreceptor 101.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Formation of Undercoat Layer

The following components were mixed and dispersed for 72 hours using a ball mill to prepare an undercoat layer coating liquid (U-$1_0$)

| | |
|---|---|
| Titanium oxide | 70 |
| (purity of 99.5%, rutile titanium oxide content of 40%, and average particle diameter of 0.07 μm) | |
| Alkyd resin | 18 |
| (BEKKOLITE M6401-50-S from Dainippon Ink & Chemicals Inc., solid content of 50%) | |
| Melamine resin | 10 |
| (SUPER BEKKAMINE L121-60 from Dainippon Ink & Chemicals Inc., solid content of 60%) | |
| Methyl ethyl ketone | 100 |

The undercoat layer coating liquid was coated on an aluminum drum which was prepared by cutting and which has a diameter of 30 mm and a length of 340 mm. The coated liquid was dried at 130° C. for 20 minutes to prepare an undercoat layer having a thickness of 3.5 μm.

In addition, the undercoat layer coating liquid was preserved for 3 months and 6 months under normal temperature condition (23±2° C.) while agitated, to prepare undercoat coating liquids U-$1_3$ and U-$1_6$. The coating liquids were also coated on such an aluminum drum as prepared above.

Formation of Charge Generation Layer

The following components were mixed and dispersed for 72 hours using a ball mill.

| | |
|---|---|
| Trisazo pigment having the following formula (1) | 10 |

$$\left[ N \underset{}{\overset{}{\diagup}} \underset{}{\diagdown} \text{—} \underset{}{\diagup} \underset{}{\diagdown} \text{—} N = N \underset{HN\diagdown}{\overset{HO\quad CONH\text{—}\diagup\diagdown}{\diagup\diagdown\diagup\diagdown}} C_2H_5 \right]_3 \quad (1)$$

| | |
|---|---|
| Polyvinyl butyral solution | 154 |
| (4 parts of a polyvinyl butyral (BM-1 from Sekisui Chemical Co., Ltd.) were dissolved in 150 parts of cyclohexanone) | |

Then 210 parts of cyclohexanone were added to the dispersion and the mixture was further dispersed for 3 hours using the ball mill.

The charge generation layer coating liquid was coated on the above-prepared three undercoat layers and the coated liquids were dried at 130° C. for 10 minutes to prepare a charge generation layer having a thickness of 0.2 μm on each undercoat layer.

Formation of Charge Transport Layer

The following components were mixed to prepare a charge transport layer coating liquid.

| | |
|---|---|
| Charge transport material having the following Formula (2) | 7 |
| Polycarbonate resin (IUPILON Z300 from Mitsubishi Gas Chemical Co., Inc.) | 10 |
| Silicone oil (KF-50 from Shin-Etsu Chemical Co., Ltd.) | 0.002 |
| Tetrahydrofuran | 100 |

$CH_3$ (2)

(Structure of Formula (2): a triarylamine with a 9,9-dimethylfluorene group; three $CH_3$ substituents on phenyl rings and N center)

The charge transport layer coating liquid was coated on each charge generation layer and the coated liquid was dried at 135° C. for 20 minutes to form a charge transport layer having an average thickness of 25 μm.

Thus, three photoreceptors (i.e., P-$1_0$, P-$1_3$ and P-$1_6$ of Example 1 were prepared.

The thus prepared undercoat layer coating liquid and photoreceptor in Example 1 were evaluated as follows.

1. Evaluation of the Undercoat Layer Coating Liquids (1) Dispersion Stability

The dispersion stability of the coating liquid U-$1_0$ was evaluated as follows.

(a) the coating liquid is contained in a test tube having a height of 10 cm;
   (b) the test tube is capped and allowed to settle for 1 month;
   (c) the height (H) of the clear portion (i.e., the supernatant liquid portion) of the coating liquid is measured.

Namely, the shorter the height of the clear portion, the better the dispersibility of the coating liquid. The height of the clear portion of the undercoat layer coating liquid U-$1_0$ was 7 mm.

(2) Coating Property

The coated undercoat layer was visually observed to determine the number of large particles (i.e., aggregates of titanium oxide) having a diameter not less than 0.5 mm in the undercoat layer. Undercoat layers were formed by coating the initial undercoat layer coating liquid, and undercoat layer coating liquids which had been preserved for 3 months and 6 months while agitating (i.e., coating liquids U-$1_0$, U-$1_3$ and U-$1_6$). As a result, there was no large particle in the three undercoat layers.

2. Evaluation of Photoreceptors (1) Black Spots

Each of the photoreceptors P-$1_0$, P-$1_3$ and P-$1_6$ was set in a copier IMAGIO MF220 manufactured by Ricoh Co., Ltd., and 20,000 images were continuously produced. The 20,000$^{th}$ image (a white image of A4 size) was visually observed to determine the number of black spots having a diameter not less than 0.5 mm.

As a result, there was no black spot in the images produced by the photoreceptors P-$1_0$, P-$1_3$ and P-$1_6$.

(2) Surface Potentials

The surface potentials (VL and VD) of a lighted area (L) and a dark area (D) of each photoreceptor were measured at the beginning and end of the 20,000-sheet running test. The voltage applied to the charger (i.e., charging roller) was −1680V.

Example 2

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.5%, a rutile titanium oxide content of 40%, and an average particle diameter of 0.15 μm.

Thus, undercoat layer coating liquids U-$2_0$, U-$2_3$ and U-$2_6$ and photoreceptors P-$2_0$, P-$2_3$ and P-$2_6$ were prepared.

Example 3

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.97%, a rutile titanium oxide content of 10% and an average particle diameter of 0.07 μm.

Thus, undercoat layer coating liquids U-$3_0$, U-$3_3$ and U-$3_6$ and photoreceptors P-$3_0$, P-$3_3$ and P-$3_6$ were prepared.

Example 4

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.97%, a rutile titanium oxide content of 40% and an average particle diameter of 0.07 μm.

Thus, undercoat layer coating liquids U-$4_0$, U-$4_3$ and U-$4_6$ and photoreceptors P-$4_0$, P-$4_3$ and P-$4_6$ were prepared.

Example 5

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.97%, a rutile titanium oxide content of 60% and an average particle diameter of 0.07 μm.

Thus, undercoat layer coating liquids U-$5_0$, U-$5_3$ and U-$5_6$ and photoreceptors P-$5_0$, P-$5_3$ and P-$5_6$ were prepared.

Example 6

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.97%, a rutile titanium oxide content of 100% and an average particle diameter of 0.07 μm.

Thus, undercoat layer coating liquids U-$6_0$, U-$6_3$, and U-$6_6$ and photoreceptors P-$6_0$, P-$6_3$ and P-$6_6$ were prepared.

Example 7

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 98.0%, a rutile titanium oxide content of 40% and an average particle diameter of 0.15 μm.

Thus, undercoat layer coating liquids U-$7_0$, U-$7_3$ and U-$7_6$ and photoreceptors P-$7_0$, P-$7_3$ and P-$7_6$ were prepared.

Example 8

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.97%, a rutile titanium oxide content of 70% and an average particle diameter of 0.07 μm.

Thus, undercoat layer coating liquids U-$8_0$, U-$8_3$ and U-$8_6$ and photoreceptors P-$8_0$, P-$8_3$ and P-$8_6$ were prepared.

Comparative Example 1

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.5%, a rutile titanium oxide content of 40% and an average particle diameter of 0.02 μm.

Thus, undercoat layer coating liquids H-$1_0$, H-$1_3$ and H-$1_6$ and photoreceptors HP-$1_0$, HP-$1_3$ and HP-$1_6$ were prepared.

Comparative Example 2

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.5%, a rutile titanium oxide content of 40% and an average particle diameter of 0.30 μm.

Thus, undercoat layer coating liquids H-$2_0$, H-$2_3$ and H-$2_6$ and photoreceptors HP-$2_0$, HP-$2_3$ and HP-$2_6$ were prepared.

Comparative Example 3

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 98.0%, a rutile titanium oxide content of 40% and an average particle diameter of 0.35 μm.

Thus, undercoat layer coating liquids H-$3_0$, H-$3_3$ and H-$3_6$ and photoreceptors HP-$3_0$, HP-$3_3$ and HP-$3_6$ were prepared.

Comparative Example 4

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 98.0%, a rutile titanium oxide content of 40% and an average particle diameter of 0.02 μm.

Thus, undercoat layer coating liquids H-$4_0$, H-$4_3$ and H-$4_6$ and photoreceptors HP-$4_0$, HP-$4_3$ and HP-$4_6$ were prepared.

Comparative Example 5

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.5%, a rutile titanium oxide content of 0% and an average particle diameter of 0.02 μm.

Thus, undercoat layer coating liquids H-$5_0$, H-$5_3$ and H-$5_6$ and photoreceptors HP-$5_0$, HP-$5_3$ and HP-$5_6$ were prepared.

Comparative Example 6

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.5%, a rutile titanium oxide content of 0% and an average particle diameter of 0.35 μm.

Thus, undercoat layer coating liquids H-$6_0$, H-$6_3$ and H-$6_6$ and photoreceptors HP-$6_0$, HP-$6_3$ and HP-$6_6$ were prepared.

Comparative Example 7

The procedures for preparation and evaluation of the undercoat layer coating liquids U-$1_0$, U-$1_3$ and U-$1_6$ and photoreceptors P-$1_0$, P-$1_3$ and P-$1_6$ in Example 1 were repeated except that the titanium oxide used in the undercoat layer coating liquid was replaced with titanium oxide having a purity of 99.5%, a rutile titanium oxide content of 0% and an average particle diameter of 0.07 μm.

Thus, undercoat layer coating liquids H-$7_0$, H-$7_3$ and H-$7_6$ and photoreceptors HP-$7_0$, HP-$7_3$ and HP-$7_6$ were prepared.

The results are shown in Tables 1 and 2.

TABLE 1

| | | Large particles (pieces) | | | Black spots (pieces) | | | |
|---|---|---|---|---|---|---|---|---|
| | (H)* (mm) | 0 month | 3 month | 6 month | 0 month | 3 month | 6 month | Abnormal image |
| Ex. 1 | 7 | 0 (U-$1_0$) | 0 (U-$1_3$) | 0 (U-$1_6$) | 0 (P-$1_0$) | 0 (P-$1_3$) | 0 (P-$1_6$) | None |

TABLE 1-continued

| | (H)* (mm) | Large particles (pieces) 0 month | 3 month | 6 month | Black spots (pieces) 0 month | 3 month | 6 month | Abnormal image |
|---|---|---|---|---|---|---|---|---|
| Ex. 2 | 10 | 0 (U-$2_0$) | 0 (U-$2_3$) | 0 (U-$2_6$) | 0 (P-$2_0$) | 2 (P-$2_3$) | 4 (P-$2_6$) | None |
| Ex. 3 | 5 | 0 (U-$3_0$) | 1 (U-$3_3$) | 2 (U-$3_6$) | 2 (P-$3_0$) | 3 (P-$3_3$) | 10 (P-$3_6$) | None |
| Ex. 4 | 5 | 0 (U-$4_0$) | 3 (U-$4_3$) | 5 (U-$4_6$) | 1 (P-$4_0$) | 4 (P-$4_3$) | 10 (P-$4_6$) | None |
| Ex. 5 | 5 | 0 (U-$5_0$) | 0 (U-$5_3$) | 0 (U-$5_6$) | 0 (P-$5_0$) | 0 (P-$5_3$) | 0 (P-$5_6$) | None |
| Ex. 6 | 5 | 0 (U-$6_0$) | 0 (U-$6_3$) | 0 (U-$6_6$) | 0 (P-$6_0$) | 0 (P-$6_3$) | 0 (P-$6_6$) | None |
| Ex. 7 | 10 | 0 (U-$7_0$) | 1 (U-$7_3$) | 2 (U-$7_6$) | 0 (P-$7_0$) | 2 (P-$7_3$) | 6 (P-$7_6$) | None |
| Ex. 8 | 5 | 0 (U-$8_0$) | 0 (U-$8_3$) | 0 (U-$8_6$) | 0 (P-$8_0$) | 0 (P-$8_3$) | 0 (P-$8_6$) | None |
| Comp. Ex. 1 | 5 | 3 (H-$1_0$) | 10 (H-$1_3$) | 12 (H-$1_6$) | 5 (HP-$1_0$) | 13 (HP-$1_3$) | 25 (HP-$1_6$) | Moiré |
| Comp. Ex. 2 | 58 | 1 (H-$2_0$) | 5 (H-$2_3$) | 10 (H-$2_6$) | 5 (HP-$2_0$) | 20 (HP-$2_3$) | 32 (HP-$2_6$) | None |
| Comp. Ex. 3 | 70 | 1 (H-$3_0$) | 5 (H-$3_3$) | 8 (H-$3_6$) | 5 (HP-$3_0$) | 20 (HP-$3_3$) | 30 (HP-$3_6$) | None |
| Comp. Ex. 4 | 5 | 1 (H-$4_0$) | 3 (H-$4_3$) | 7 (H-$4_6$) | 3 (HP-$4_0$) | 8 (HP-$4_3$) | 18 (HP-$4_6$) | Moiré |
| Comp. Ex. 5 | 6 | 6 (H-$5_0$) | 11 (H-$5_3$) | 16 (H-$5_6$) | 12 (HP-$5_0$) | 18 (HP-$5_3$) | 30 (HP-$5_6$) | Moiré |
| Comp. Ex. 6 | 68 | 10 (H-$6_0$) | 20 (H-$6_3$) | 30 (H-$6_6$) | 15 (HP-$6_0$) | 30 (HP-$6_3$) | 50 (HP-$6_6$) | None |
| Comp. Ex. 7 | 10 | 5 (H-$7_0$) | 10 (H-$7_3$) | 15 (H-$7_6$) | 10 (HP-$7_0$) | 15 (HP-$7_3$) | 25 (HP-$7_6$) | None |

(H)*: the height of the clear portion of the coating liquid.

TABLE 2

| | At the beginning of the running test | | At the End of the running test | |
|---|---|---|---|---|
| | VD (-V) | VL (-V) | VD (-V) | VL (-V) |
| Ex. 1 | 900 | 120 | 890 | 140 |
| Ex. 2 | 905 | 110 | 890 | 110 |
| Ex. 3 | 890 | 110 | 860 | 135 |
| Ex. 4 | 900 | 120 | 905 | 125 |
| Ex. 5 | 900 | 130 | 900 | 135 |
| Ex. 6 | 900 | 120 | 890 | 150 |
| Ex. 7 | 905 | 130 | 920 | 170 |
| Ex. 8 | 905 | 125 | 900 | 135 |
| Comp. Ex. 1 | 900 | 140 | 920 | 190 |
| Comp. Ex. 2 | 900 | 150 | 930 | 200 |
| Comp. Ex. 3 | 910 | 160 | 940 | 230 |
| Comp. Ex. 4 | 920 | 180 | 950 | 280 |
| Comp. Ex. 5 | 860 | 200 | 770 | 310 |
| Comp. Ex. 6 | 830 | 180 | 730 | 250 |
| Comp. Ex. 7 | 850 | 170 | 775 | 240 |

As can be understood from the above description, since the undercoat layer coating liquid includes titanium oxide, which is dispersed in a resin and an organic solvent and which has an average particle diameter greater than 0.05 μm and less than 0.20 μm and a rutile titanium oxide content of from 10 to 100%, the resultant coating liquid has preservation stability (i.e., good pigment dispersion) and the resultant undercoat layer has good hiding power and good film formability (i.e., pinholes are hardly formed in the resultant undercoat layer) Therefore the resultant photoreceptor can produce high quality images with hardly causing abnormal images such as black spots, moiré and background fouling. When the titanium oxide has a rutile titanium oxide content of from 10 to 100%, images with less background fouling can be produced.

When the titanium oxide further has a purity not less than 99.0%, the resultant photoreceptor can maintain good electrophotographic properties even when environmental conditions (e.g., humidity) change and/or the photoreceptor is repeatedly used for a long period of time. In particular, occurrence of black spots can be avoided.

When the rutile titanium oxide content is from 30 to 70%, background fouling can be further improved.

This document claims priority and contains subject matter related to Japanese Patent Application No. 2001-282368, filed on Sep. 17, 2001 incorporated herein by reference.

Having now fully described the invention, it will be apparent to one of ordinary skill in the art that many changes and modifications can be made thereto without departing from the spirit and scope of the invention as set forth therein.

What is claimed is as new desired to be secured by Letters Patent of the United States is:

1. An electrophotographic image forming method comprising:
   charging a photoreceptor;
   irradiating the photoreceptor with imagewise light to form an electrostatic latent image on the photoreceptor using a light source selected from the group consisting of laser diodes and light emitting diodes;

developing the electrostatic latent image with a developer including a toner to form a toner image on the photoreceptor using a reverse development method; and transferring the toner image onto a receiving material, wherein the photoreceptor comprises:

an electroconductive substrate;

an undercoat layer located overlying the electroconductive substrate and comprising titanium oxide, said titanium oxide having an average particle diameter greater than 0.05 µm and less than 0.20 µm and comprising rutile titanium oxide in an amount of from 10 to 100% by weight based on total weight of the titanium oxide; and a photosensitive layer overlying the undercoat layer;

wherein the titanium oxide has a purity of not less than 99.0% by weight.

2. The electrophotographic image forming method according to claim 1, wherein the titanium oxide comprises 30 to 70% by weight rutile titanium oxide based on the total weight of the titanium oxide.

3. The electrophotographic image forming method according to claim 1, wherein the photosensitive layer comprises a charge generation layer and a charge transport layer.

4. A method for manufacturing a photoreceptor comprising:

coating an undercoat layer coating liquid on an electroconductive substrate to form an undercoat layer on the electroconductive substrate; and coating a photosensitive layer coating liquid comprising a charge generation material and a charge transport material to form a photosensitive layer overlying the undercoat layer, wherein the undercoat layer coating liquid comprises:

a binder resin;

titanium oxide; and an organic solvent, wherein the titanium oxide comprises rutile titanium oxide in an amount of from 10 to 100% by weight based on total weight of the titanium oxide, and wherein said titanium oxide is dispersed in the binder resin and organic solvent, and has an average particle diameter greater than 0.05 µm and less than 0.20 µm;

wherein the titanium oxide has a purity of not less than 99.0% by weight.

5. The method according to claim 4, wherein the titanium oxide comprises 30 to 70% by weight rutile titanium oxide based on the total weight of the titanium oxide.

6. The method according to claim 4, wherein coating a photosensitive layer coating liquid comprises:

coating a charge generation layer coating liquid comprising the charge generation material; and coating a charge transport layer coating liquid comprising the charge transport material.

7. The method according to claim 1, wherein the titanium oxide has a purity of not less than 99.0% by weight and comprises 30 to 70% by weight of rutile titanium oxide based on the total weight of the titanium oxide.

8. The method according to claim 4, wherein the titanium oxide has a purity of not less than 99.0% by weight and comprises 30 to 70% by weight of rutile titanium oxide based on the total weight of the titanium oxide.

9. The method according to claim 1, wherein the undercoat further comprises anatase titanium oxide.

10. The method according to claim 1, wherein the undercoat further comprises an electroconductive powder.

11. The method according to claim 1, wherein the undercoat comprises rutile titanium oxide in an amount of from 30 to 40% by weight.

12. The method according to claim 1, wherein the average particle diameter of the titanium oxide in the undercoat is from 0.07 82 m to 0.15 82 m.

13. The method according to claim 1, wherein the titanium oxide in the undercoat has a purity of not less than 99.0% by weight and comprises 40 to 60% by weight of rutile titanium oxide based on the total weight of the titanium oxide.

14. The method according to claim 4, wherein the undercoat further comprises anatase titanium oxide.

15. The method according to claim 4, wherein the undercoat further comprises an electroconductive powder.

16. The method according to claim 4, wherein the undercoat comprises rutile titanium oxide in an amount of from 30 to 40% by weight.

17. The method according to claim 4, wherein the average particle diameter of the titanium oxide in the undercoat is from 0.07 µm to 0.15 µm.

18. The method according to claim 4, wherein the titanium oxide in the undercoat has a purity of not less than 99.0% by weight and comprises 40 to 60% by weight of rutile titanium oxide based on the total weight of the titanium oxide.

* * * * *